United States Patent
Heuer et al.

(10) Patent No.: US 6,717,953 B1
(45) Date of Patent: Apr. 6, 2004

(54) METHOD OF AND FACILITY FOR CONVERTING A SONET SIGNAL TO AN SDH SIGNAL

(75) Inventors: Volkmar Heuer, Ditzingen (DE); Harald Kleine-Altekamp, Sachsenheim (DE); Hans-Jörg Jäkel, Stuttgart (DE)

(73) Assignee: Alcatel, Paris (FR)

( * ) Notice: Subject to any disclaimer, the term of this patent is extended or adjusted under 35 U.S.C. 154(b) by 741 days.

(21) Appl. No.: 09/656,069

(22) Filed: Sep. 6, 2000

(30) Foreign Application Priority Data

Sep. 11, 1999 (DE) .......................... 199 43 625

(51) Int. Cl.⁷ ................................ H04J 3/16
(52) U.S. Cl. ................... 370/466; 370/539; 370/907
(58) Field of Search .................. 370/463, 465, 370/466, 467, 907, 537, 538, 541, 542, 543, 539

(56) References Cited

U.S. PATENT DOCUMENTS

| | | | |
|---|---|---|---|
| 6,011,802 A | * | 1/2000 | Norman ................... 370/466 |
| 6,377,586 B1 | * | 4/2002 | Seo et al. ................. 370/442 |
| 6,426,958 B1 | * | 7/2002 | Crossett et al. ........... 370/466 |
| 6,477,178 B1 | * | 11/2002 | Wakim et al. ............ 370/466 |
| 6,603,776 B1 | * | 8/2003 | Fedders et al. ........... 370/476 |
| 6,633,584 B1 | * | 10/2003 | Russell et al. ........... 370/466 |

OTHER PUBLICATIONS

ITU–T G. 707, Chapter 6.4, (Mar. 1996).

* cited by examiner

Primary Examiner—Douglas Olms
Assistant Examiner—Bob A. Phunkulh
(74) Attorney, Agent, or Firm—Sughrue Mion, PLLC

(57) ABSTRACT

SONET and SDH signals are framed multiplex signals which are composed of multiplex units according to a respective specified multiplex hierarchy, such that smaller multiplex units are multiplexed in larger multiplex units and that the larger multiplex units are transmitted in frames. Compared to the multiplex hierarchy of SONET, the multiplex hierarchy of SDH has an additional level, namely the VC-4. A method of converting a SONET signal to an SDH signal is disclosed in which the multiplex units of the SONET signals are converted to corresponding multiplex units of the SDH signal, which are multiplexed into multiplex units of the additional hierarchy level. Monitoring functions are applied to both signals in accordance with the SDH multiplex hierarchy. In applying the monitoring functions to the SONET signal, the additional level of the SDH multiplex hierarchy is simulated by setting parameters to be monitored to default values. Thus, there is no need for two separate management systems, since on the SONET side, monitoring can be performed by the SDH management.

5 Claims, 3 Drawing Sheets

METHOD OF AND FACILITY FOR CONVERTING A SONET SIGNAL TO AN SDH SIGNAL

BACKGROUND OF THE INVENTION

This invention relates to a method of and a facility for converting a first synchronous communications signal of a first synchronous digital communication system to a second synchronous communications signal for a second-communication system. In particular, the invention relates to a method of and a facility for converting a SONET signal to an SDH signal and vice versa.

User data to be transmitted over a synchronous digital communication network are packed in containers (C). The containers may vary in size according to the user data volume. The containers are provided with an overhead —this combination is referred to as a virtual container (VC)—and are packed in transport frames referred to as synchronous transport modules (STMs). Smaller virtual containers are first combined into a larger virtual container. The larger virtual containers can be positioned freely within the frames. A pointer in the overhead of a frame points to the beginning of the larger virtual container. The combination of the larger virtual container and the pointer is called an administrative unit (AU). In the overhead of the larger virtual container, pointers point to the beginning of the smaller virtual containers. The latter together with the respective pointers associated with them are referred to as tributary units (TU).

Two variants of synchronous digital communication systems are known. In Europe, a system known as Synchronous Digital Hierarchy (SDH) is used, while the North American System is known as the Synchronous Optical Network (SONET). The two systems differ only slightly, but as a result of the differences, the systems are not directly compatible.

In the multiplex hierarchy of SDH, the largest virtual container is the VC-4 with a capacity of 149 Mb. In the VC-4, several smaller containers of the VC-3, VC-2, or VC-12 type can be multiplexed. The VC-4 together with its pointer is called an AU-4, and the smaller containers with the associated pointers are called TU-3s and TU-2s. An STM-1 transport module carries one AU-4, which, in turn, may contain three TU-3s.

In SONET, the largest container is the VC-3 with a capacity of 49 Mb. The VC-3 may contain several smaller containers of the VC-2 or VC-11 type. In SONET, the virtual containers are also frequently referred to as "virtual tributaries" (VT). The VC-3 together with its pointer is called an AU-3, and the smaller containers with their associated pointers are called TU-2s. A container compatible with the VC-4 of SDH does not exist in SONET. In an STM-1 frame, also referred to in SONET as an STS-3 (electrical) or an OC-3 (optical), three AU-3s are transported, each of which may contain seven TU-2s. The SDH and SONET multiplex hierarchies described are specified in ITU-T G.707, Chapter 6. Accordingly, compared with the multiplex hierarchy of SONET, the multiplex hierarchy of SDH comprises an additional level, namely the VC-4. The other levels of the two multiplex hierarchies correspond to each other. The hierarchy levels of the two systems are shown in FIGS. 8 and 9 and are explained in detail below.

To connect a synchronous digital communication network of the SDH type with a synchronous digital communication network of the SONET type, plesiochronous interfaces, such as DS-3s or E1s, have so far been used, which support a transmission rate of 45 Mb. The user data are transmitted at the VC-3 level via the plesiochronous interface, and at the other end, new VC-3s are formed. This has the disadvantage that SDH monitoring functions, such as end-to-end monitoring of the transmission path, cannot be executed, since the overheads of the containers are not transmitted via the plesiochronous interface.

As an alternative, ITU-T G.707, Chapter 6.4, specifies a direct interconnection of the synchronous transport modules STM-1 of SDH and SONET at the VC-3 level. An AU-3 of SONET is reduced to a VC-3. For the VC-3, a new pointer is determined, thus forming a TU-3. Three TU-3s are combined into a VC-4, and a pointer is determined for the VC-4 to form an AU-4, which is then transmitted in a synchronous transport module STM-1.

In a synchronous digital communication network, alarm surveillance and performance monitoring are carried out for each virtual container. To that end, overhead bytes of the individual virtual containers are interpreted. The results are communicated to a central network management system. As the multiplex hierarchies of SDH and SONET differ, the monitoring functions to be performed differ also. Therefore, SDH and SONET systems each have their own network management system. The above-mentioned direct connection at the STM-1 level between SDH and SONET involves the difficulty that SONET-specific monitoring functions have to be performed on the SONET side of the conversion facility, and SDH-specific ones on the SDH side. Thus, the network element that performs the conversion must perform monitoring functions of both systems. This involves a considerable amount of complexity, since the network element then requires two logically separate controllers. In addition, problems may occur in the cooperation of the two logically separate controllers. It is therefore not desirable to have to perform monitoring functions of different communication systems in one network element.

SUMMARY OF THE INVENTION

It is therefore an object of the invention to provide a method whereby a communications signal of a first synchronous digital communication system can be converted to a communications signal of a second communication system without having to perform monitoring functions of both systems. Another object of the invention is to provide a facility for converting a communications signal of a first synchronous digital communication system to a communications signal of a second communication system which requires only one controller for performing monitoring functions.

These objects are attained by a method of converting a first synchronous communications signal of a first synchronous digital communication system (SONET) to a second synchronous communications signal for a second communication system (SDH), wherein the first and second communications signals are framed multiplex signals which are composed of multiplex units (TU-2, TU-3, AU-3, AU-4) according to a respective specified multiplex hierarchy in such a way that smaller multiplex units (TU-2, TU-3) are multiplexed in larger multiplex units (AU-4, AU-3) and that the larger multiplex units (AU-4, AU-3) are transmitted in frames (STM-1), wherein the multiplex hierarchy of the first communication system (SONET) comprises at least one level corresponding to a level of the multiplex hierarchy of the second communication system (SDH), whose multiplex hierarchy includes an additional level (VC-4) in comparison with the multiplex hierarchy of the first communication system (SONET), and wherein the multiplex units (AU-3) of the first communications signal are converted to corresponding multiplex units (TU-3) of the second communications signal, which are then multiplexed into multiplex units (AU-4) of the additional hierarchy level,, characterized in that monitoring functions according to the multiplex hierarchy of the second communication system (SDH) are applied to both communications signals, and that in applying the monitoring functions to the first communications signal, the additional level of the multiplex hierarchy of the second communication system (SDH) is simulated by setting parameters to be monitored to default values.

The invention further resides in a facility for performing this method.

Further features and advantages of the invention will be apparent from the detailed description below.

The invention has the advantage of permitting end-to-end monitoring at the VC-3 level.

BRIEF DESCRIPTION OF THE DRAWINGS

The invention will become more apparent by reference to the following description of an embodiment taken in conjunction with the accompanying drawings, in which.

DETAILED DESCRIPTION OF THE INVENTION

In Europe, a synchronous digital transmission technology referred to as Synchronous Digital Hierarchy (SDH) is used. In North America, a similar transmission protocol standard referred to as Synchronous Optical Network (SONET) is employed. So far, two communication systems each based on a respective one of the two standards are interconnected via plesiochronous 45-Mb interfaces. In future, however, such systems are to be interconnected directly at the STM-1 level. This is shown schematically in FIG. 1. An SDH system 11 is connected via an STM-1 link 12 with a SONET system 13. This is possible because the frame formats of the two systems are identical, i.e. both systems use a synchronous transport module of the STM-1 type. In the nomenclature of SONET, such an STM-1 signal is also called an STS-3 if transmitted electrically, or an OC-3 (optical carrier) if transmitted optically. The transmission systems are networks of optically or electrically interconnected network elements.

However, differences exist between the two systems in the multiplex hierarchy according to which the frames are packed with user data. The transmitted communications signals are multiplex signals that are made up of different-size multiplex units. Smaller multiplex units are combined into larger multiplex units, and the larger multiplex units are packed in the frames. The larger multiplex units can be arbitrarily positioned within the payload areas of the frames and may also extend over two consecutive frames. A pointer in the payload of the frames addresses the beginning of the largest multiplex unit contained therein.

In SDH, the largest multiplex unit, which must be contained in each frame, is the AU-4 (Administrative Unit). In SONET, there is no multiplex unit of that size, and each frame must contain three AU-3 multiplex units. In SDH, the multiplex unit equivalent to the AU-3 is the TU-3 (Tributary Unit), which, however, must be multiplexed in the larger multiplex unit AU-4. Thus, compared with the SONET hierarchy, the multiplex hierarchy of SDH has one additional level.

This necessitates converting communications signals formatted according to the multiplex hierarchy of SONET to communications signals formatted according to the multiplex hierarchy of SDH. Such a conversion is performed in a line interface circuit of a multiplexer, e.g., in an interface card of an add/drop multiplexer or of a digital crossconnect.

Figure 1:
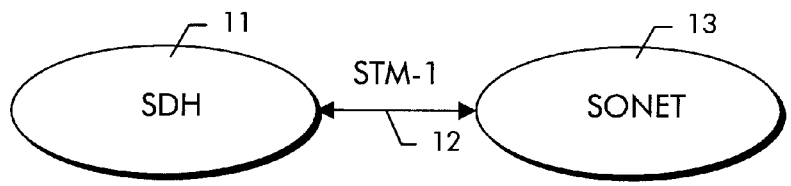
FIG. 1 shows an SDH network and a SONET network that are interconnected at the STM-1 level.
Figure 2:
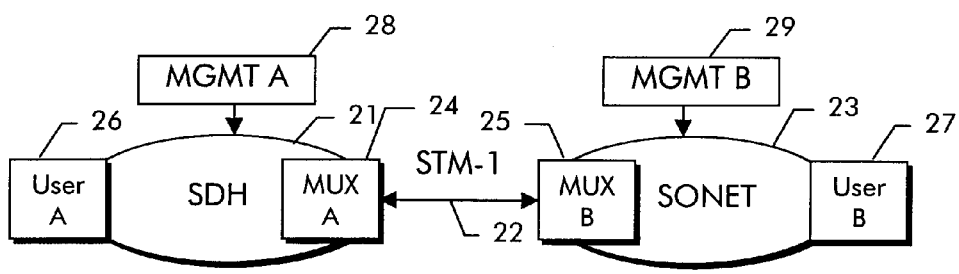
FIG. 2 is a more detailed view of the networks of FIG. 2 in which conversion is performed by a multiplexer.

FIG. 2 therefore shows the network interconnection of FIG. 1 in some more detail. An SDH system 21 is connected with a SONET system 23 by an STM-1 link 22. The actual physical connection between the two networks is an optical or electric transmission line between two multiplexers MUX A, 24, and MUX B, 25. MUX A is part of the SDH system, while MUX B is part of the SONET system. Over this connection 22, a user A, 26, of SDH system 21 can exchange communications signals with a user B, 27, of SONET system 23.

For the conversion, there are two alternatives. Either MUX A, 24, converts the multiplex signals specified in SDH from an STM-1 frame with one AU-4 multiplex unit to an STM-1 frame with three AU-3 multiplex units and transmits the latter to MUX B, 25, or MUX B receives an SDH-specific STM-1 AU-4-structured communications signal and converts it to an STM-1/AU3-structured communications signal. How exactly this conversion is accomplished will be described later.

In any case, the conversion must be performed in one of the two multiplexers shown, i.e., either in multiplexer 24 or in multiplexer 25. The two communication systems 21, 23 each have their own central management system 28, 29. All network elements of a system must perform various monitoring functions, such as alarm surveillance and performance monitoring, and communicate the results of the monitoring to the network management. For that, recourse must be had to overhead bytes of the multiplex units. The monitoring functions must be performed at all levels of the multiplex hierarchy. If, for example, the conversion is performed by MUX A, the latter has to perform the monitoring functions at the levels of the SDH hierarchy in the SDH-side interface circuit, and the monitoring functions according to the SONET hierarchy in the SONET-side interface. However, since MUX A forms part of the SDH system, it must communicate the results of the monitoring only to the higher-level network management system of the SDH system.

Since this double-track monitoring is complicated and costly and would lead to complications, a basic idea of the invention is to perform the monitoring functions according to only one of the two multiplex hierarchies and simulate additional hierarchy levels of the other multiplex hierarchy, and to set those parameters of the additional hierarchy levels which are relevant to monitoring functions to default values.

Figure 3:
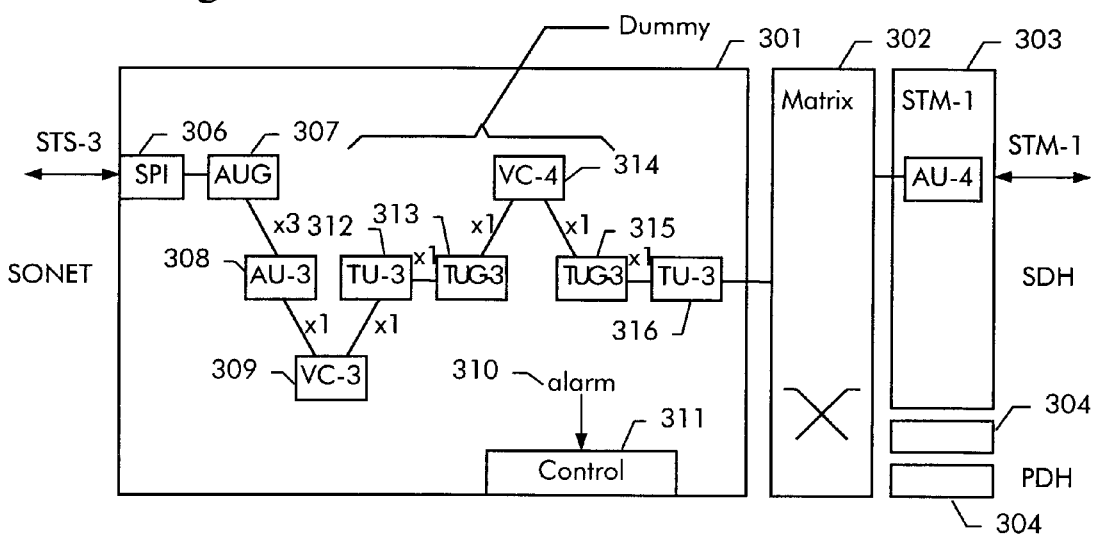
FIG. 3 is a logical representation of the multiplexer that performs the conversion.

A block diagram of a multiplexer that uses this method is shown in FIG. 3. The multiplexer has a first line unit 301, which is connected to a switching matrix 302. Further line units 303, 304 are shown schematically on the other side of the switching matrix.

The first line unit is designed for the reception of communications signals from a SONET system. Such SONET-specific communications signals are, for example, the electric STS-3 signal, which is organized in frames that are identical with the SDH frames STM-1. In an interface circuit SPI, 306, the electrical properties are adapted, the frames are read and their pointers and multiplexer section overheads MSOH are interpreted. The signal contained in the payload of the frame is passed on to an administrative unit group circuit AUG 307. There, the three AU-3 multiplex units grouped in one AUG are demultiplexed and transferred, with a time offset or in parallel, to an AU-3 multiplex unit circuit 308. The latter forms VC-3 containers from the received AU-3 multiplex units and transfers these VC-3s to a VC-3 virtual container circuit 309, where the overheads of the VC-3s are interpreted and monitoring functions are performed at the VC-3 multiplex level. The monitoring functions that are applied to each VC-3 include alarm surveillance and performance monitoring. Alarms 310, which are set in a corresponding overhead byte of a VC-3, are signaled to a controller 311, from which they can be called for by the higher-level management system of the network.

With the functional units described in the following, the multiplex level that is missing in comparison with the SDH multiplex hierarchy is simulated. This multiplex level will be described in reference to only one of the three VC-3 containers contained in each frame of the received communications signal. In a circuit 312, the VC-3 container is converted to a TU-3 multiplex unit, which is "grouped" into a TUG-3 in a circuit 313. This step is only of a formal nature, since the "group" formed contains only one VC-3. In a circuit 314, multiplex unit group TUG-3 is assigned to a simulated VC-4 container. With that, the hierarchy level that is missing compared to SDH has been emulated. Circuit 314 now applies the monitoring functions of the simulated hierarchy level to the VC-4 by communicating the result of the monitoring functions in the form of default values to controller 311. These default values are "good" values for all parameters to be monitored, i.e., an "all o.k." communications is produced for alarms and "signal errorfree" communications are produced for performance monitoring data. The simulated monitoring functions are denoted in FIG. 3 as "Dummy".

The monitoring functions of the multiplex level that is missing compared to the SDH hierarchy have thus been performed, so that the network management system of the SDH network is satisfied. Next, the logical assignment to the simulated VC-4 is canceled by forming a multiplex unit group TUG-3 (in circuit 315) and extracting the TU-3 multiplex unit contained therein (in circuit 316). The TU-3 is then supplied to switching matrix 302. This switching matrix is the core of the multiplexer and switches the applied multiplex units in the time and space domains to predefined outputs in order to establish paths in the communication system.

From switching matrix 302, the TU-3 is transferred to line unit 303, which transmits synchronous communications signals of the SDH type. The TU-3 is combined with, e.g., two further TU-3 multiplex units into a VC-4 multiplex unit, from which an administrative unit AU-4 is formed by determining an associated pointer. This AU-4 is then transmitted as payload in an STM-1 frame.

In the embodiment, the functions described are performed by separate circuit groups. It should be pointed out, however, that the same functions can also be implemented in software in a processor-controlled facility. It is assumed that a person skilled in the art and having the foregoing and following descriptions before him or her will be able to implement the conversion and monitoring functions in software without difficulty.

Figure 4:
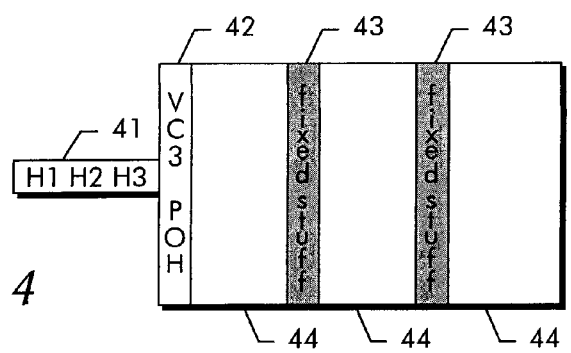
FIG. 4 shows the largest multiplex unit of SONET, the AU-3.

How the multiplex units of SDH and SONET are structured and how the conversion is performed will now be described with reference to FIGS. 4 to 7. FIG. 4 shows the largest multiplex unit of SONET, an AU-3. It includes the pointer 41, which is contained in the overhead of a frame and occupies the three overhead bytes designated H1, H2, and H3. The pointer addresses the beginning of the multiplex unit. The latter has a column structure and contains a first column 42 with an overhead and an adjoining container with user data. The container, in turn, contains two columns 43 of fixed stuff, and payload sections 44. Each column contains one byte per row, and the multiplex units are transmitted row by row.

Figure 5:
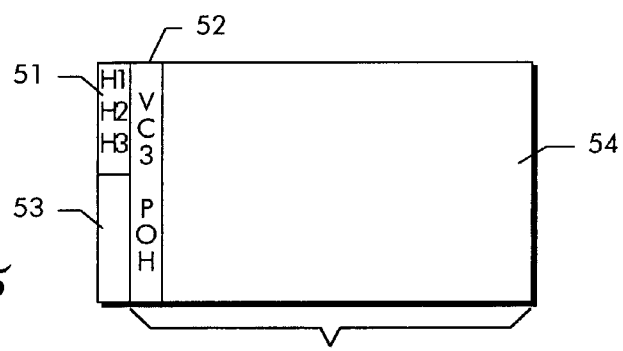
FIG. 5 shows the equivalent multiplex unit of SDH, the TU-3.

FIG. 5 shows the equivalent multiplex unit in the SDH hierarchy, namely the TU-3. The TU-3, too, contains a pointer 51 and a section of fixed stuff 53. This is followed by the overhead 52 and a container 54 with user data. Unlike the SONET AU-3, container 54 does not contain columns of fixed stuff.

Accordingly, during the conversion from AU-3 to TU-3, a new pointer for the position of the multiplex unit in a multiplex unit of the next higher level is calculated. In addition, the columns of fixed stuff of the AU-3 are removed and any stuffing bytes contained therein are written into section 53 of TU-3.

Figure 6:
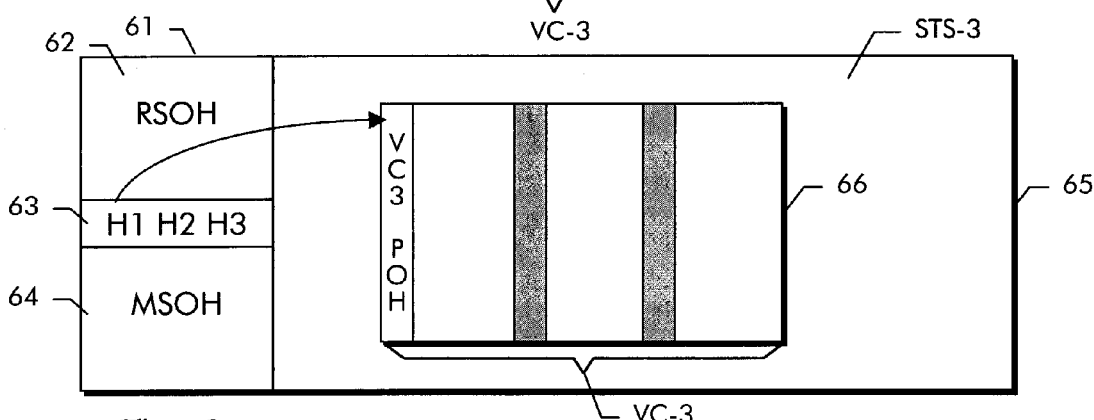
FIG. 6 shows an STS-3 frame of SONET, containing one AU-3 multiplex unit in this example.

FIG. 6 shows how in SONET, an AU-3 is packed and transmitted in an STM-1(=STS-3 or OC-3) frame. The STM-1 frame consists of overhead 61 and payload 65. The overhead is divided into a regenerator section overhead RSOH, 62, a pointer 63, and a multiplexer section overhead MSOH, 64. The pointer, which occupies byte positions H1, H2, and H3 of the overhead, addresses the administrative unit AU-3, which is contained in the payload and consists of pointer 63 itself and a virtual container 66, so that it has the structure shown in FIG. 4. Bytes H1, H2, and H3 are each present in triplicate, so that a total of three AU-3s can be addressed.

Figure 7:
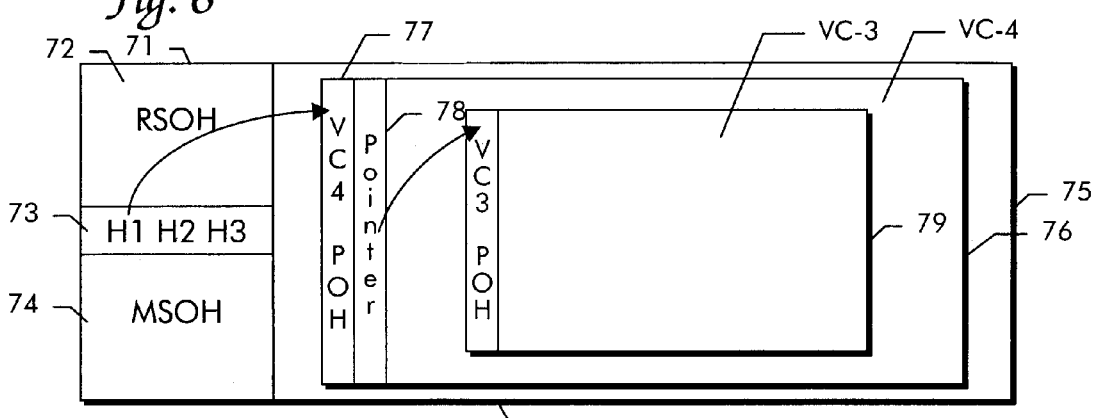
FIG. 7 shows an STM-1 frame of SDH, containing, in this example, one AU-4 multiplex unit which, in turn, contains one TU-3 multiplex unit.

FIG. 7 shows the analogous multiplexing according to the multiplex hierarchy of SDH. The STM-1 frame has the same structure as the frame in FIG. 6, and consists of overhead 71 and payload 75. Overhead 71 again consists of a regenerator section overhead RSOH, 72, a pointer 73, and a multiplexer section overhead MSOH, 74. In this case, however, pointer 73 addresses an AU-4 multiplex unit in the payload. This AU-4 consists of the pointer itself and a VC-4 virtual container 76. The VC-4 76 has a path overhead (POH) 77 as the first column, and a further pointer 78, which addresses a smaller multiplex unit of the TU-3 type in the payload, as the second column. The TU-3 consists of pointer 78 and a VC-3. The structure of the VC-3 is identical to that of the VC-3 of FIG. 6 except for the two columns of fixed stuff, as shown in FIGS. 4 and 5.

FIGS. 4 to 7 also illustrate how SONET-structured signals are converted to SDH-structured signals. First, the columns of fixed stuff are removed. That is easily done, since their positions in the VC-3 are fixed. Next, a higher-level multiplex unit VC-4 is formed and a new pointer is determined which indicates the position of the VC-3 in the VC-4. Then, a pointer is determined for the VC-4 which indicates the position of the latter in the frame, thus forming an AU-4 multiplex unit. What is important is that in accordance with the invention, alarms and performance monitoring data of the missing multiplex level, i.e., for the VC-4, are set to default values and that these default values are communicated to the network management system.

In the example, the conversion was described with respect to only one multiplex unit for the sake of clarity. An STM-1, however, can transport three AU-3s. Likewise, three TU-3s can be transported in one AU-4. However, analogously to the procedure shown for an AC-3, the conversion and multiplexing of the multiplex units of SONET and SDH can also be performed for three AU-3s without restriction.

Figure 8:
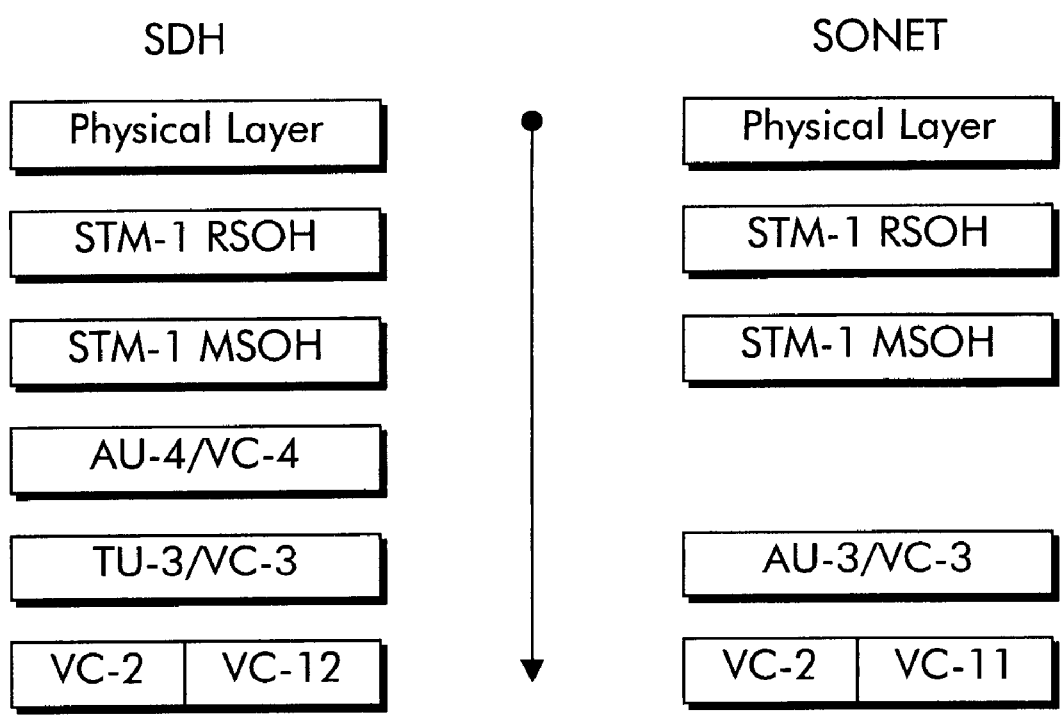
FIG. 8 shows the multiplex hierarchies of SDH and SONET.

FIG. 8 shows the multiplex hierarchies of SDH and SONET in detail. The hierarchy from the bottom level to the top level is shown in the direction of the arrow, i.e., from top to bottom. Corresponding hierarchy levels are shown at the same level. The bottom level is the physical layer, e.g., an amplitude-modulated optical signal transmitted over optical fibers. The second and third hierarchy levels represent the STM-1 frame. The latter is divided into two levels according to the division of the overhead into RSOH and MSOH, since the two overhead sections are interpreted and terminated at different points in the network. The fourth hierarchy level in SDH is the AU-4, i.e., a VC-4 with associated pointer. In SONET, there is no equivalent hierarchy level. The fifth hierarchy level in SDH is the TU-3, i.e., a VC-3 with associated pointer in the VC-4. The equivalent hierarchy level in SONET is the AU-3, i.e., a VC-3 with associated pointer in the overhead of the frame. In SDH, three TU-3s forming a TUG-3 can be multiplexed into one VC-4. In SONET, three AU-3s are packed in each frame. The top level is formed by the VC-2s and VC-12s in SDH and by the VC-2s and VC-11s in SONET. There is no direct correspondence between VC-12 of SDH and VC-11 of SONET, since they have different capacities, namely 2 Mb and 1.5 Mb, respectively. However, a VC-11 can be converted to a VC-12, or the VC-11 can also be transported as such in SDH.

What is claimed is:

1. A method of converting a first synchronous communications signal of a first synchronous digital communication system (SONET) to a second synchronous communications signal for a second communication system (SDH), wherein the first and second communications signals are framed multiplex signals which are composed of multiplex units (TU-2, TU-3, AU-3, AU-4) according to a respective specified multiplex hierarchy in such a way that smaller multiplex units (TU-2, TU-3) are multiplexed in larger multiplex units (AU-4, AU-3) and that the larger multiplex units (AU-4, AU-3) are transmitted in frames (STM-1), wherein the multiplex hierarchy of the first communication system (SONET) comprises at least one level corresponding to a level of the multiplex hierarchy of the second communication system (SDH), whose multiplex hierarchy includes an additional level VC-4) in comparison with the multiplex hierarchy of the first communication system (SONET), and wherein the multiplex units (AU-3) of the first communications signal are converted to corresponding multiplex units (TU-3) of the second communications signal, which are then multiplexed into multiplex units (AU-4) of the additional hierarchy level, characterized in that monitoring functions according to the multiplex hierarchy of the second communication system (SDH) are applied to both communications signals, and that in applying the monitoring functions to the first communications signal, the additional level of the multiplex hierarchy of the second communication system (SDH) is simulated by setting parameters to be monitored to default values.

2. A method as claimed in claim 1 wherein the monitoring functions comprise alarm surveillance and transmission performance monitoring.

3. A method as claimed in claim 1 wherein the first communication system is a SONET network and the second communication system is an SDH network, wherein the first communications signal is organized into first frames of the STS-3 type each containing three AU-3 multiplex units which each comprise a VC-3 virtual container and a first pointer (H1, H2, H3) addressing the VC-3 virtual container, wherein the second communications signal is organized into transport frames of the STM-1 type each containing one AU-4 multiplex unit which comprises a VC-4 virtual container and a first pointer (H1, H2, H3) addressing the VC-4 virtual container, wherein the AU-4 multiplex units contain subunits of the TU-3 type in the payload, wherein the AU-3 multiplex units of the first communications signal are converted to the TU-3 subunits of the second communications signal, wherein the three TU-3 subunits are multiplexed into an AU-4 multiplex unit of the second communications signal, which is then transported in the STM-1 frame of the second communications signal, and wherein prior to the conversion, each AU-3 multiplex unit is logically assigned a simulated VC-4 virtual container whose alarms and performance parameters are set to the default values.

4. A method as claimed in claim 1 wherein during the conversion, specified columns of fixed stuff are removed from the multiplex units of the first communications signal.

5. A facility (24, 25) for converting a first synchronous communications signal of a first synchronous digital communication system (SONET) to a second synchronous communications signal for a second communication system (SDH), the communications signals being framed multiplex signals which are composed of multiplex units according to a respective specified multiplex hierarchy in such a way that smaller multiplex units (TU-2, TU-3) are multiplexed in larger multiplex units (AU-4, AU-3) and that the larger multiplex units are transmitted in frames (STM-1), the multiplex hierarchy of the first communication system (SONET) comprising at least one level corresponding to a level of the multiplex hierarchy of the second communication system (SDH), whose multiplex hierarchy includes an additional level (VC-4) in comparison with the multiplex hierarchy of the first communication system (SONET), said facility comprising a conversion unit (301) which converts multiplex units (AU-3) of the first communications signal to corresponding multiplex units (TU-3) of the second communications signal and multiplexes said corresponding multiplex units into multiplex units (AU-4) of the additional hierarchy level, characterized by
a monitoring device (311) for applying monitoring functions to both communications signals according to the multiplex hierarchy of the second communication system (SDH) and for simulating the additional level (VC-4) of the multiplex hierarchy of the second communication system (SDH) during the application of the monitoring functions to the first communications signal by setting parameters to be monitored to default values.

* * * * *